United States Patent
Rieck, Jr. et al.

[11] Patent Number: 6,065,928
[45] Date of Patent: May 23, 2000

[54] TURBINE NOZZLE HAVING PURGE AIR CIRCUIT

[75] Inventors: Harold P. Rieck, Jr., Middletown; Jeffrey A. Kress, Evendale, both of Ohio

[73] Assignee: General Electric Company, Cincinnati, Ohio

[21] Appl. No.: 09/119,914

[22] Filed: Jul. 22, 1998

[51] Int. Cl.$^7$ ........................................ F01D 5/18
[52] U.S. Cl. ...................... 415/115; 416/96 R; 416/97 R
[58] Field of Search ................................ 415/115, 116, 415/173.4, 173.5, 173.7; 416/96 A, 96 R, 97 R

[56] References Cited

U.S. PATENT DOCUMENTS

| | | |
|---|---|---|
| 5,207,556 | 5/1993 | Frederick et al. ...................... 415/115 |
| 5,217,348 | 6/1993 | Rup, Jr. et al. ........................ 415/115 |
| 5,358,374 | 10/1994 | Correia et al. ........................... 415/47 |
| 5,645,397 | 7/1997 | Soechting et al. ..................... 415/115 |
| 5,772,398 | 6/1998 | Noiret et al. ............................ 415/115 |

*Primary Examiner*—Edward K. Look
*Assistant Examiner*—Liam McDowell
*Attorney, Agent, or Firm*—Andrew C. Hess; Rodney M. Young

[57] ABSTRACT

A turbine nozzle includes radially outer and inner bands between which extend a plurality of vanes. The vanes include impingement baffles having impingement holes for impinging cooling air inside the vane for cooling thereof. An air circuit is disposed in the inner band and includes a plurality of outlet holes. A transfer tube is disposed in flow communication between respective ones of the baffles and the air circuit for channeling thereto a portion of the cooling air from inside the baffles as pre-impingement air for discharge through the outlet holes.

20 Claims, 4 Drawing Sheets

TURBINE NOZZLE HAVING PURGE AIR CIRCUIT

BACKGROUND OF THE INVENTION

The present invention relates generally to gas turbine engines, and, more specifically, to rotor cavity purging.

In a gas turbine engine, air is pressurized in stages in a multi-stage compressor and mixed with fuel in a combustor for generating hot combustion gases which flow downstream through several turbine stages. A high pressure turbine (HPT) includes a turbine nozzle at the combustor exit which channels the combustion gases between the HPT rotor blades which extract energy therefrom for powering the compressor.

The HPT may include a second stage with a corresponding turbine nozzle disposed downstream of the first stage blades followed in turn by a row of second stage turbine blades which extract additional energy from the combustion gases for also powering the compressor. A low pressure turbine typically follows the HPT and extracts further energy for powering a fan upstream of the compressor which produces propulsion thrust for powering an aircraft in flight.

As the combustion gases flow downstream through the turbine stages the pressure thereof is decreased as energy is extracted therefrom. Accordingly, an inter-stage seal is provided radially inboard of the second stage turbine nozzle to prevent the higher pressure combustion gases upstream of the nozzle from bypassing the nozzle to the second stage turbine blades. The seal is defined in part by a seal ring having forward and aft ends defining blade retainers attached to the corresponding rotor disks of the first and second stage blades.

An axially intermediate portion of the seal ring includes radially extending seal teeth which cooperate with an annular seal pad, typically in the form of honeycomb, which is attached to an inner band of the second stage nozzle. The seal teeth and pad define a labyrinth seal which provides a substantial flow restriction against the flow of air or combustion gases therethrough.

The forward portion of the seal ring defines with the first stage turbine rotor and the forward portion of the second stage nozzle inner band an upstream or forward cavity, and the aft portion of the seal ring defines with the aft portion of the inner band and the second stage turbine rotor a downstream or aft annular cavity.

The seal ring rotates with the first and second stage rotors and is subject to being heated therewith during operation. The forward and aft rotor cavities are typically purged with a source of cooling air during operation for reducing the temperature thereof for maintaining an effective useful life of the adjoining rotor components. The cavity purge air is typically provided by using compressor bleed air which first cools the vanes of the second stage nozzle and then is discharged into the forward and aft cavities for purging thereof.

The second stage vanes typically include corresponding perforated impingement baffle inserts therein which receive the cooling air from the compressor for impingement against the inner surface of the vane for vane cooling. The spent impingement air is then discharged through the nozzle inner band through respective forward and aft purge air holes disposed in flow communication with the respective forward and aft rotor cavities.

The post-impingement purge air has limited cooling capability for the rotor cavities since its temperature has increased substantially due to the impingement cooling of the vanes, and it has a reduced pressure available to drive it through the purge holes. Since the forward cavity is at a higher pressure than the aft cavity, less of a differential pressure with the supplied purge air is available in the former as compared with the latter.

Accordingly, the forward purge holes are typically not tangentially inclined through the inner band in view of the lack of available differential pressure, which results in increased temperature rise thereof due to windage thereof in the forward cavity as the first stage rotor rotates relative to the stationary inner band. However, a greater driving pressure differential is available in the aft cavity and therefore the aft purge holes may be tangentially inclined to direct the purge air tangentially toward the rotating second stage rotor for reducing windage losses and reducing the increase in temperature of the purge air.

Since the vane cooling air is obtained by bleeding a portion of compressor air at an intermediate stage upstream of the compressor exit its supply pressure is limited, and its differential pressure with the sink pressure in the rotor cavities decreases as engine speed and temperatures increase. The purge air to the rotor cavities is therefore reduced when it is needed the most.

Accordingly, the structural and functional operating characteristics of the rotor cavities limit the available cooling thereof which correspondingly limits the power potential of the engine over a suitable useful life.

One modification placed in commercial service to address the limited rotor cavity cooling includes a single dump hole added to the bottom of the impingement baffle in each vane near the trailing edge thereof. The dump hole provides pre-impingement air from the baffle directly into a common cavity feeding both the forward and aft purge holes. This modification has demonstrated in over a year of service limited improvement in rotor cavity cooling, at the expense of vane impingement cooling.

Accordingly, it is desired to provide a turbine nozzle having improved purge air cooling of the forward and aft rotor cavities.

BRIEF SUMMARY OF THE INVENTION

A turbine nozzle includes radially outer and inner bands between which extend a plurality of vanes. The vanes include impingement baffles having impingement holes for impinging cooling air inside the vane for cooling thereof. An air circuit is disposed in the inner band and includes a plurality of outlet holes. A transfer tube is disposed in flow communication between respective ones of the baffles and the air circuit for channeling thereto a portion of the cooling air from inside the baffles as pre-impingement air for discharge through the outlet holes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

1 showing an impingement baffle and purge air circuit in accordance with an exemplary embodiment of the present invention.

Figures 2, 3:
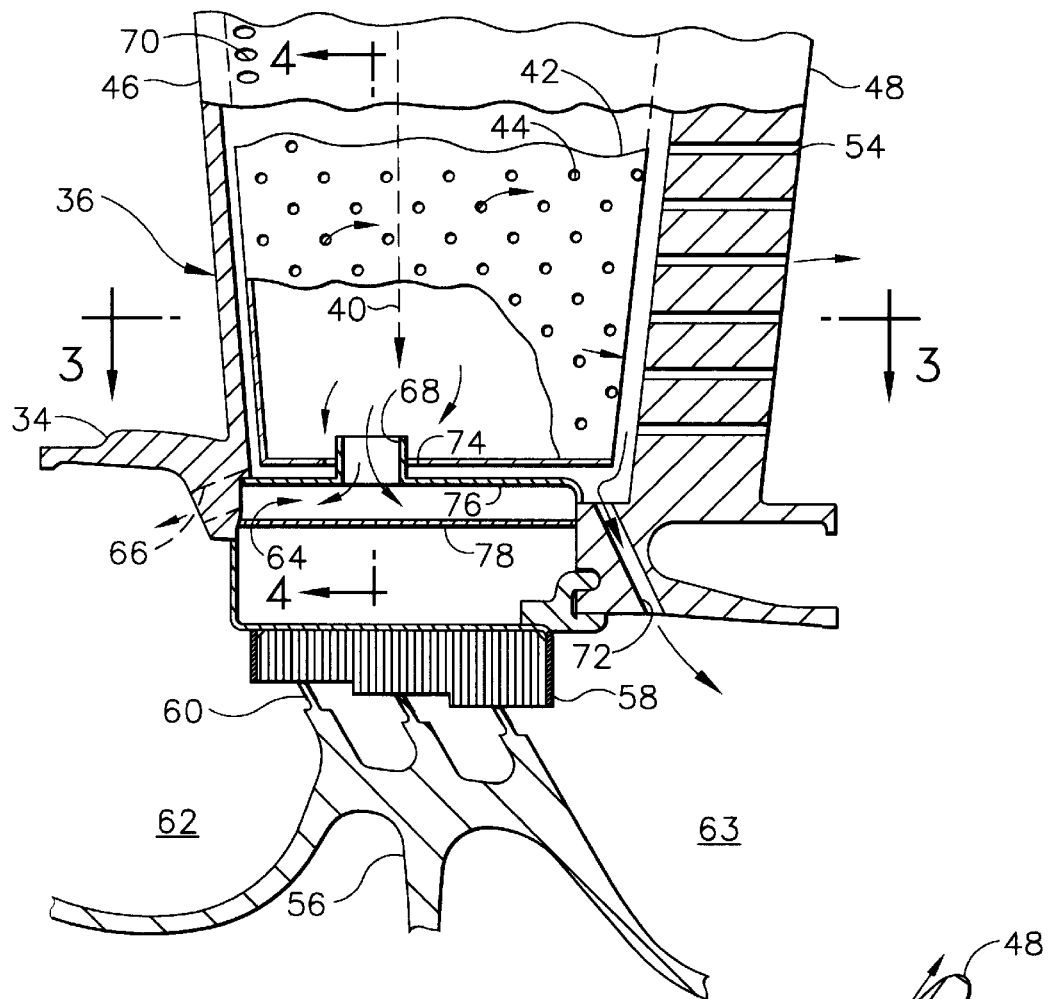
FIG. 2 is an enlarged, elevational partly sectional view of an inboard portion of the turbine nozzle illustrated in FIG.

FIG. 3 is a radial sectional view through the nozzle vane illustrated in FIG. 2 and taken along line 3—3.

Figure 4:
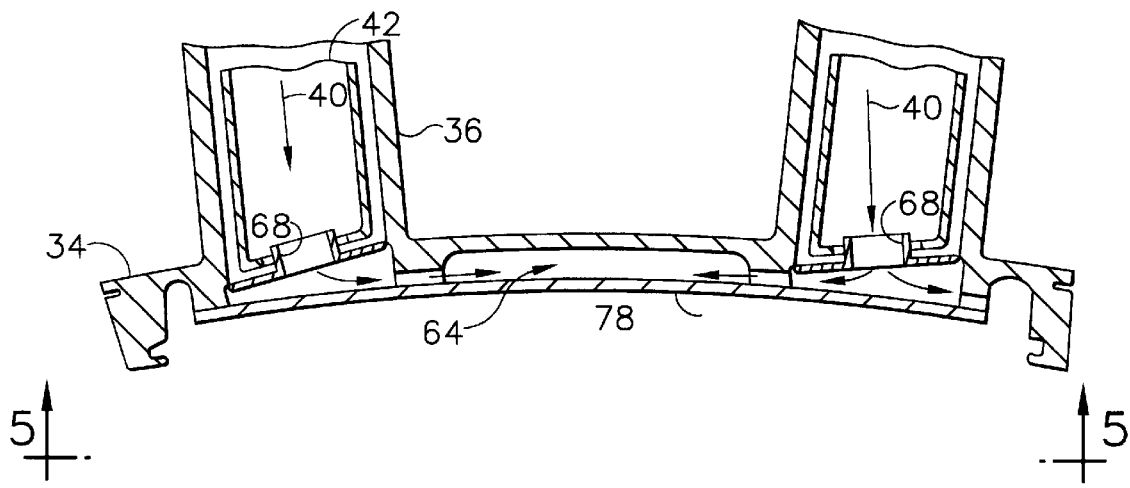

FIG. 4 is an elevational sectional view through the turbine nozzle segment illustrated in FIG. 2 and taken along line 4—4.

Figure 5:
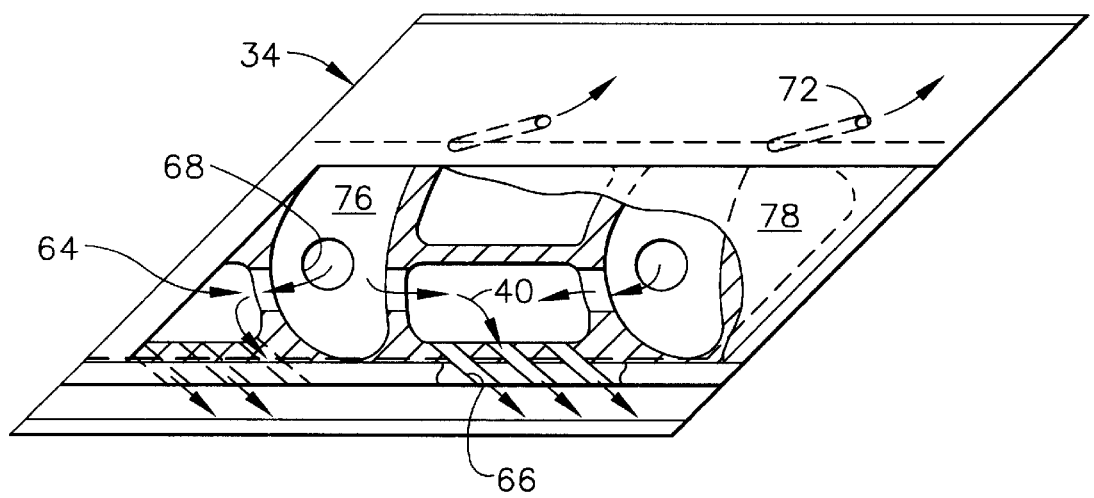

FIG. 5 is an outboard facing view of the inner band illustrated in FIG. 5 and taken along line 5—5.

Figure 1:
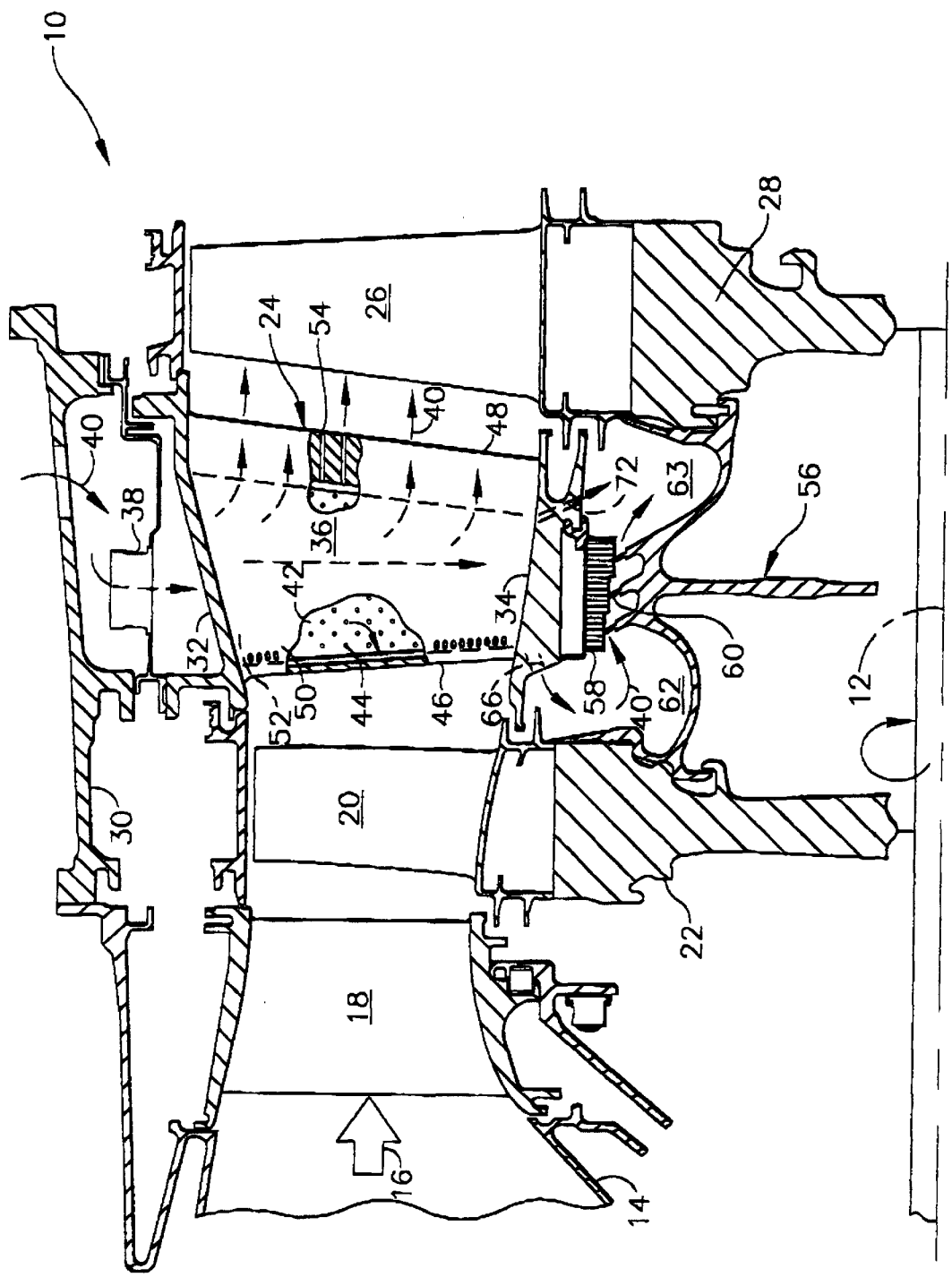
FIG. 1 is an axial sectional view of a portion of an aircraft turbofan gas turbine engine having a turbine nozzle in accordance with an exemplary embodiment of the present invention.
Figure 6:
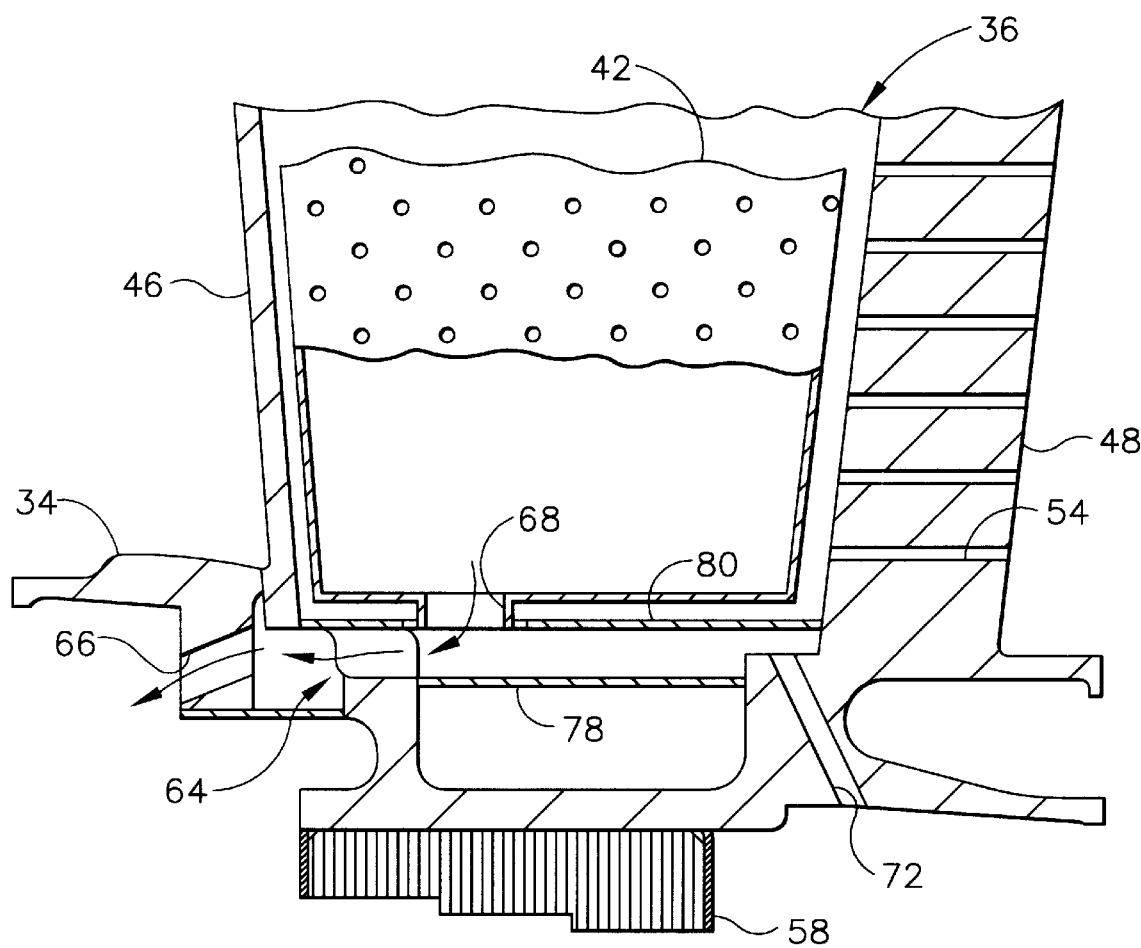

FIG. 6 is an elevational, partly sectional view of the inboard portion of the turbine nozzle illustrated in FIG. 1 in accordance with a second embodiment of the present invention.

DETAILED DESCRIPTION OF THE INVENTION

Illustrated in FIG. 1 is a portion of an aircraft turbofan gas turbine engine 10 which is axisymmetrical about a longitudinal or axial centerline axis 12. The engine includes a multi-stage axial compressor (not shown) which provides compressed air to an annular combustor 14, an outlet portion of which is illustrated in the Figure, wherein it is mixed with fuel and ignited for generating hot combustion gases 16. The combustion gases flow downstream through a two stage high pressure turbine (HPT) which drives the compressor.

The HPT includes a first stage turbine nozzle 18 immediately downstream of the combustor 14 which channels the combustion gases between first stage turbine blades 20 extending radially outwardly from a supporting first rotor 22 in the form of a disk. Following the first rotor 22 is a second stage turbine nozzle 24 which in turn channels the combustion gases 16 between second stage turbine blades 26 extending radially outwardly from a supporting second rotor 28, also in the form of a disk.

The second stage nozzle 24 is suitably mounted to an annular outer casing 30 by a radially outer shroud or band 32. Spaced radially inwardly from the outer band is a radially inner shroud or band 34. A plurality of hollow nozzle stator vanes 36 extend radially between the outer and inner bands and are fixedly joined thereto, in a common casting for example. In a typical configuration, two circumferentially spaced apart vanes 36 are mounted to corresponding arcuate segments of the outer and inner bands in each of several arcuate nozzle segments which are collectively joined together in a complete nozzle ring coaxially about the engine centerline.

The outer band 32 includes an air inlet 38 atop each vane 36 through which is received compressed air 40 bled at an intermediate stage of the compressor prior to the compressor outlet. The bleed air 40 is used as cooling air in the vanes 36.

More specifically, each of the vanes 36 includes an impingement baffle 42 having a plurality of impingement holes 44 therein in a laterally spaced apart pattern for impinging the air inside each vane 36 against the inner surface thereof for impingement cooling. Each vane 36 includes a leading edge 46, an axially opposite trailing edge 48, and circumferentially opposite convex suction side 50 and concave pressure side 52 extending axially therebetween and radially between the outer and inner bands 32,34. Each vane 36 also includes a row of trailing edge holes 54 through which a portion of the post-impingement air is discharged.

Since the second stage nozzle 24 is axially disposed between the first and second stage turbine blades 20,26, a differential pressure in the combustion gases 16 is effected during operation. Accordingly, the inner band 34 extends forwardly to corresponding inner platforms of the first stage blades 20, and aftly to corresponding platforms of the second stage blades 26 to provide a substantially continuous inner flowpath for the combustion gases.

Furthermore, an inter-stage seal ring 56 is fixedly joined to both the first and second rotors 22,28 and cooperates with a complementary inter-stage seal pad 58 fixedly joined to the inner band 34. The seal pad 58 is in the form of an annular honeycomb member which cooperates with corresponding seal teeth 60 at the middle of the ring 56. The seal teeth 60 define with the seal pad 58 a labyrinth seal which is effective for maintaining the differential pressure across the second stage nozzle 24.

The seal ring 56 includes an annular portion forward of the teeth 60 to define an annular forward cavity 62 between the first rotor 22 and the inner band 34, and also includes a portion aft from the teeth 60 which defines an annular aft cavity 63 between the aft portion of the inner band 34 and the second rotor 28. In the exemplary embodiment illustrated in FIG. 1, the forward and aft portions of the seal ring 56 are in the form of blade retainers correspondingly axially retaining the individual first and second stage blades 20,26 at their dovetails in the corresponding axial dovetail slots in the perimeter of the respective rotors.

The engine 10 as above described is conventional in structure and operation. However, in accordance with the present invention, the cooling air 40 is channeled through the inner band 34 in a new manner for improving purge cooling of both the forward and aft rotor cavities 62,63.

More specifically, the inboard portion of the second stage nozzle 24 is illustrated in more particularity in FIG. 2. An independent and dedicated air circuit 64 is disposed in the inner band and includes a plurality of circumferentially spaced apart first or forward outlet holes 66. Each vane 36 includes a respective transfer tube 68 disposed in flow communication between respective ones of the baffles 42 and the common air circuit 64 for directly channeling thereto a portion of the cooling air 40 from inside the baffles as pre-impingement air for discharge through the outlet holes 66. The air circuit 64 and cooperating transfer tubes 68 are illustrated in more particularity in FIGS. 3–5.

The cooling air 40 has its greatest pressure and lowest temperature inside the individual baffles 42, with the pressure thereof decreasing and the temperature thereof increasing after being channeled through the impingement holes 44 in impingement against the inner surface of the vanes. The pre-impingement cooling air is therefore more effective for providing rotor cavity cooling than the post-impingement air typically found in the prior art.

The first outlet holes 66 are disposed in the inner band 34 adjacent the leading edges 46 of the vanes, and therefore define forward outlet holes for discharging the pre-impingement cooling air into the forward rotor cavity 62. The high pressure-low temperature pre-impingement cooling air in the forward cavity 62 more effectively cools the adjoining rotor components thereof, and secondarily improves the cooling of the aft cavity 63 upon leaking thereto past the seal teeth 60.

In view of the higher pressure available in the pre-impingement cooling air discharged by the forward holes 66 into the forward cavity 62, the forward outlet holes are preferably angled or inclined tangentially in the circumferential direction of rotation of the first stage rotor 22 as best shown in FIG. 5. Sufficient driving pressure is now available to use such inclined holes to minimize the windage losses associated with discharging the cooling air from the stationary nozzle 24 to the rotating rotor 22. Reduced windage losses reduces the increase in temperature of the purge air further improving rotor cavity purging and cooling.

As shown in FIGS. 4 and 5, the air circuit 64 is the form of a cross channel extending circumferentially in the bottom of the inner band between adjacent ones of the transfer tubes 68. The inner band 34 is typically a cast component having reinforcing ribs for strength and intervening pockets for light weight. The cross channel circuit 64 may be conveniently provided using the available pockets and additionally forming recesses in the intervening ribs to provide a flowpath between the transfer tubes 68 and the forward outlet holes 66.

As shown in FIG. 5, the outlet holes 66 are conveniently provided through a circumferentially extending forward rib of the inner band and communicate with respective ones of the pockets therein. In this configuration, the forward holes 66 may be conveniently angled circumferentially or tangentially in the exemplary range of about 25°–40° in a direction of rotation of the first stage rotor for reducing windage losses as discussed above. And, the several forward outlet holes 66 may be supplied with the pre-impingement cooling air from the common cross channel 64 fed by air from the several transfer tubes 68 in each nozzle segment.

Since a portion of the pre-impingement cooling air 40 inside each of the baffles 42 is being removed therefrom through the air circuit 64 for use in purging the forward cavity 62, it is not available for impingement cooling the inner surface of the vanes.

Accordingly, corresponding changes in vane cooling are provided. For example, and as shown in FIG. 3, the baffle impingement holes 44 are preferably more closely spaced together along the vane pressure side 52 than along the vane suction side 50. And, each of the vanes further includes a row of film cooling holes 70 solely along the suction side 50 adjacent the leading edge 46. The post-impingement cooling air is therefor discharged from the outer surface of the vanes solely through the trailing edge holes 54 and the film cooling holes 70.

The increased spacing of the impingement holes on the suction side allows a decrease in the total number thereof having the same diameter for maintaining maximum performance of impingement cooling with the loss of the portion of the cooling air channeled through the forward purge holes 66. The suction side film cooling holes 70 effect a film or boundary layer of cooling air along the vane suction side which complements the decreased impingement cooling thereof for adequately cooling the vanes themselves.

As shown in FIG. 2, the inner band 34 also includes a plurality of second or aft outlet holes 72 disposed in flow communication with respective ones of the vanes for receiving therefrom a portion of the cooling air from inside the vanes for use in purging the aft rotor cavity 64.

As shown in FIG. 1, the first stage rotor 22 is disposed adjacent the vane leading edges 46, with the second stage rotor 26 being disposed the vane trailing edges 48. The inter-stage seal ring 56 and pad 58 are disposed axially therebetween. And, the aft purge holes 72 are disposed in flow communication with the aft cavity 63 to provide aft, post-impingement purge air thereto, whereas the forward purge holes 66 are disposed in flow communication with the forward cavity 62 to provide pre-impingement purge air thereto at a greater pressure than the post-impingement purge air.

In the exemplary embodiment illustrated in FIG. 2, the air provided to the aft purge holes 72 is solely post-impingement air discharged from the baffle inside the vane. Since the aft rotor cavity 63 is at a lower pressure than the forward cavity 62, the lower pressure post-impingement cooling air provided through the aft purge holes 72 has sufficient driving pressure which allows the aft holes 72 to also be inclined for reducing windage losses. The air supplied to the after purge holes 72 is therefore independent from the air circuit 64 dedicated to the forward purge holes 66 and optimizes purge air cooling of the different forward and aft rotor cavities.

In the exemplary embodiment illustrated in FIGS. 2–5, the transfer tube 68 in each vane is fixedly attached to the inner band 34, and extends through an aperture 74 in the bottom of the baffle 42. The mounting aperture 74 is preferably slightly larger than the outer diameter of the transfer tube 68 so that a portion of the pre-impingement air 40 may leak through the gap therebetween and additionally feed the aft purge holes 72.

As initially shown in FIG. 2, the transfer tube 68 is preferably fixedly attached to a sheet metal cap or collar 76, with the collar being sealingly attached to the inner band, by brazing for example, to isolate the air circuit 64 from the post-impingement flowpath inside the vane.

As shown in FIG. 5, the tube collar 76 has a truncated, airfoil profile matching a portion of the inside profile of the individual vanes, and may be brazed to the surrounding ribs of the inner band. The air circuit 64 may be defined in part by a sheet metal cover 78, as shown in FIGS. 4 and 5 for example, which may be brazed atop the corresponding ribs of the inner band 34.

FIG. 6 illustrates an alternate embodiment to the invention which is otherwise identical with the FIG. 2 embodiment except for the attachment of the transfer tubes 68 and configuration of the air circuit 64 cooperating therewith. In this embodiment, each transfer tube 68 is fixedly attached to the bottom of the baffle 42 itself, and extends through an aperture in a sheet metal septum 80 joined to the inner band 34. The septum 80, like the collar 76 in the FIG. 2 embodiment defines with the cover 78 the air circuit 64 therebetween for supplying pre-impingement cooling air through the forward purge holes 66.

If desired, the aft purge holes 72 may also be disposed in flow communication with the same air circuit 64 between the septum 80 and the cover 78 for receiving the pre-impingement cooling air for purging the aft rotor cavity 63. Since the pre-impingement cooling air is at a greater pressure than the post-impingement cooling air inside the vane, a portion of the former will leak through the clearance gap around the transfer tube 68 back into the vane for discharge from the trailing edge holes 54.

In both embodiments disclosed above, the pre-impingement cooling air is fed to the forward rotor cavity 62 at a higher pressure and lower temperature than that available from post-impingement cooling air inside the vane. Improved cooling and performance in the forward rotor cavity is obtained, which correspondingly improves cooling of the aft rotor cavity 63 as well.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the united states is the invention as defined and differentiated in the following claims:

What is claimed is:

1. A turbine nozzle comprising:

an outer band;

an inner band;

a plurality of nozzle vanes extending between said outer and inner bands, and each including an inlet for receiving cooling air;

a plurality of impingement baffles each disposed in respective ones of said vanes, and each including a plurality of impingement holes for impinging said air inside said vanes;

an air circuit disposed in said inner band and including a plurality of outlet holes; and a plurality of transfer tubes each disposed in flow communication between respective ones of said baffles and said air circuit for channeling thereto a portion of said cooling air from inside said baffles as pre-impingement air for discharge through said outlet holes.

2. A nozzle according to claim 1 wherein said vanes have leading and trailing edges, and said outlet holes are disposed in said inner band adjacent said leading edges to define forward outlet holes.

3. A nozzle according to claim 2 wherein:

said air circuit comprises a cross channel extending in said inner band between adjacent ones of said transfer tubes; and said forward outlets holes are disposed in flow communication with said cross channel.

4. A nozzle according to claim 3 wherein said inner band is arcuate, and said forward outlet holes are inclined tangentially.

5. A nozzle according to claim 3 wherein:

said vanes further include opposite suction and pressure sides;

said baffle impingement holes are more closely spaced together along said pressure side than said suction side; and said vanes include film cooling holes solely along said suction side adjacent said leading edge.

6. A nozzle according to claim 3 wherein said inner band further includes a plurality of aft outlet holes disposed in flow communication with respective ones of said vanes for receiving therefrom a portion of said cooling air from inside said vanes.

7. A nozzle according to claim 6 wherein each of said transfer tubes is fixedly attached to said inner band, and extends through an aperture in said baffle.

8. A nozzle according to claim 7 wherein each of said transfer tubes is fixedly attached to a collar, and said collar is sealingly attached to said inner band to isolate said air circuit from said vane.

9. A nozzle according to claim 6 wherein each of said transfer tubes is fixedly attached to said baffle, and extends through an aperture in said inner band.

10. A nozzle according to claim 6 in combination with:

a first turbine rotor disposed adjacent said vane leading edges;

a second turbine rotor disposed adjacent said vane trailing edges;

an inter-stage seal pad fixedly joined to said inner band;

an inter-stage seal ring fixedly joined to both said first and second rotors, and cooperating with said seal pad to define an annular forward cavity between said first rotor and said inner band, and an annular aft cavity between said inner band and said second rotor; and said aft outlet holes are disposed in flow communication with said aft cavity to provide purge air thereto, and said forward outlet holes are disposed in flow communication with said forward cavity to provide purge air thereto at a greater pressure than from said aft outlet holes.

11. A turbine nozzle comprising:

an outer band;

an inner band;

a plurality of nozzle vanes extending between said outer and inner bands, and each including an inlet for receiving cooling air, opposite suction and pressure sides, and film cooling holes solely along said suction side adjacent a leading edge of said vanes;

a plurality of impingement baffles each disposed in respective ones of said vanes, and each including a plurality of impingement holes for impinging said air inside said vanes, with said holes being more closely spaced together along said pressure side than said suction side;

an air circuit disposed in said inner band and including a plurality of outlet holes; and a plurality of transfer tubes each disposed in flow communication between respective ones of said baffles and said air circuit for channeling thereto a portion of said cooling air from inside said baffles as pre-impingement air for discharge through said outlet holes.

12. A turbine nozzle comprising:

an outer band;

an inner band;

a plurality of nozzle vanes extending between said outer and inner bands, and each including an inlet for receiving cooling air;

a plurality of impingement baffles each disposed in respective ones of said vanes, and each including a plurality of impingement holes for impinging said air inside said vanes;

an air circuit disposed in said inner band and including a plurality of outlet holes; and a plurality of transfer tubes each disposed in flow communication between respective ones of said baffles and said air circuit for channeling thereto a portion of said cooling air from inside said baffles as pre-impingement air for discharge through said outlet holes, and each of said tubes is fixedly attached to said inner band and extends through an aperture in said baffle.

13. A turbine nozzle comprising:

an outer band;

an inner band;

a plurality of nozzle vanes each extending between said outer and inner bands, and each including an inlet for receiving cooling air;

a plurality of impingement baffles disposed in respective ones of said vanes, and each including a plurality of impingement holes for impinging said air inside said vanes;

an air circuit disposed in said inner band and including a plurality of outlet holes; and a plurality of transfer tubes each disposed in flow communication between respective ones of said baffles and said air circuit for channeling thereto a portion of said cooling air from inside said baffles as pre-impingement air for discharge through said outlet holes, and each of said tubes is fixedly attached to said baffle and extends through an aperture in said inner band.

14. A turbine apparatus comprising:

a turbine nozzle including a plurality of nozzle vanes extending between outer and inner bands, and each vane includes an inlet for receiving cooling air, and leading and trailing edges;

a plurality of impingement baffles each disposed in respective ones of said vanes, and each including a plurality of impingement holes for impinging said air inside said vanes;

an air circuit disposed in said inner band and including a plurality of forward outlet holes adjacent said leading edges;

said inner band further includes a plurality of aft outlet holes disposed in flow communication with respective ones of said vanes for receiving therefrom a portion of said cooling air from inside said vanes;

a plurality of transfer tubes each disposed in flow communication between respective ones of said baffles and said air circuit for channeling thereto a portion of said cooling air from inside said baffles as pre-impingement air for discharge through said forward outlet holes;

a first turbine rotor disposed adjacent said vane leading edges;

a second turbine rotor disposed adjacent said vane trailing edges;

an inter-stage seal pad fixedly joined to said inner band;

an inter-stage seal ring fixedly joined to both said first and second rotors, and cooperating with said seal pad to define an annular forward cavity between said first rotor and said inner band, and an annular aft cavity between said inner band and said second rotor; and said aft outlet holes are disposed in flow communication with said aft cavity to provide purge air thereto, and said forward outlet holes are disposed in flow communication with said forward cavity to provide purge air thereto at a greater pressure than from said aft outlet holes.

15. A turbine nozzle comprising:

a plurality of hollow nozzle vanes extending between outer and inner bands, and including respective impingement baffles therein; and means for discharging pre-impingement air from inside said baffles through said inner band.

16. A nozzle according to claim 15 wherein said discharging means are configured for cross channeling said pre-impingement air from said baffles circumferentially across said inner band.

17. A nozzle according to claim 15 further comprising means for discharging post-impingement air from inside said vanes and outside said baffles through said inner band.

18. A nozzle according to claim 17 wherein said post-impingement air discharging means are independent from said pre-impingement air discharging means.

19. A method of purge cooling forward and aft turbine cavities defined between a turbine nozzle and respective upstream and downstream rotors comprising:

discharging into said forward cavity pre-impingement air from inside baffled-vanes of said nozzle; and discharging into said aft cavity post-impingement air from inside said vanes.

20. A method according to claim 19 wherein said air is discharged independently to said forward and aft cavities, with greater air pressure into said forward cavity.

* * * * *